United States Patent
Malaga et al.

(10) Patent No.: US 9,159,242 B2
(45) Date of Patent: Oct. 13, 2015

(54) REAL-TIME FAULT DETECTION IN AN INSTRUMENT LANDING SYSTEM

(71) Applicant: Honeywell International Inc., Morristown, NJ (US)

(72) Inventors: Alfonso Malaga, Sammamish, WA (US); Walter Devensky, Bellevue, WA (US)

(73) Assignee: Honeywell International Inc., Morristown, NJ (US)

( * ) Notice: Subject to any disclaimer, the term of this patent is extended or adjusted under 35 U.S.C. 154(b) by 126 days.

(21) Appl. No.: 13/941,130

(22) Filed: Jul. 12, 2013

(65) Prior Publication Data

US 2015/0019051 A1 Jan. 15, 2015

(51) Int. Cl.
*G08G 5/02* (2006.01)
*G01S 1/02* (2010.01)
*G01S 1/14* (2006.01)

(52) U.S. Cl.
CPC . *G08G 5/02* (2013.01); *G01S 1/026* (2013.01); *G01S 1/14* (2013.01)

(58) Field of Classification Search
CPC .............. G01S 1/026; G01S 1/14; G08G 5/02
USPC .............. 340/947; 324/500, 527; 342/33, 35; 701/17; 702/108, 113, 117
See application file for complete search history.

(56) References Cited

U.S. PATENT DOCUMENTS

| | | | |
|---|---|---|---|
| 3,750,176 A | 7/1973 | Sawicki et al. | |
| 3,820,115 A | 6/1974 | Stone | |
| 4,390,949 A * | 6/1983 | Beningfield et al. | 701/17 |
| 4,916,612 A | 4/1990 | Chin et al. | |
| 5,254,998 A * | 10/1993 | LaBerge et al. | 342/35 |
| 5,592,131 A * | 1/1997 | Labreche et al. | 342/35 |
| 5,712,628 A * | 1/1998 | Phillips et al. | 342/30 |
| 5,859,878 A * | 1/1999 | Phillips et al. | 375/316 |
| 5,909,193 A * | 6/1999 | Phillips et al. | 701/17 |
| 8,711,993 B2 * | 4/2014 | Malaga et al. | 375/350 |
| 2011/0216859 A1 | 9/2011 | Bibaut | |
| 2012/0147929 A1 | 6/2012 | Malaga et al. | |

FOREIGN PATENT DOCUMENTS

EP  0343295  11/1989

OTHER PUBLICATIONS

European Patent Office, "Office Action from EP Application No. 14173998.7 mailed Mar. 5, 2015", "from Foreign Counterpart of U.S. Appl. No. 13/941,130", Mar. 5, 2015, pp. 1-7, Published in: EP.

* cited by examiner

*Primary Examiner* — John Q Nguyen
*Assistant Examiner* — Anshul Sood
(74) *Attorney, Agent, or Firm* — Fogg & Powers LLC

(57) ABSTRACT

An electronic system with real-time fault detection is provided. In one embodiment, the system includes analog circuitry, having a first input coupled to receive an input signal and a second input coupled to receive a test signal. The test signal is at an edge of a selected band that contains the input signal. The test signal is used to identify faults in the electronic system during operation of the electronic system. The electronic system further includes an analog to digital (A/D) converter coupled to an output of the analog circuitry. The A/D converter generates digitized spectrum. Digital circuitry is coupled to the output of the A/D converter. The digital circuitry processes the input signal from the band to provide an output for the system and processes the test signal to detect faults in the analog circuitry, the digital circuitry and the A/D converter.

20 Claims, 4 Drawing Sheets

US 9,159,242 B2

REAL-TIME FAULT DETECTION IN AN INSTRUMENT LANDING SYSTEM

BACKGROUND

An instrument landing system (ILS) is a ground-based system that provides precision guidance to an aircraft approaching and landing on a runway. The ILS uses Very High Frequency (VHF) and Ultra High Frequency (UHF) guidance signals to enable a safe landing during conditions such as low ceilings or reduced visibility due to fog, rain, or blowing snow. The ILS includes ground-based transmitters that transmit the guidance signals to a receiver on-board the aircraft. The guidance signals produce ILS navigation outputs that are used by the flight control system to bring the aircraft to a safe landing on the runway.

Undetected malfunction of ILS receiver signal processing may result in mission failure that could have catastrophic consequences. Thus, conventional systems have built-in fault detection capabilities. Some on-board ILS receivers detect possible malfunctions using two or more identical receiver paths, coupled to a shared antenna, and tuned to the same radio channel containing the ILS guidance signal broadcasted by the ILS ground station. Each ILS receiver path performs identical, or near-identical, computations on the same input signal to produce the ILS radio guidance data. A malfunction is detected when ILS receiver paths produce different guidance data. The drawback of this approach is the cost associated with employing additional full receiver paths and the reduction in receiver sensitivity associated with splitting the antenna output into multiple inputs for each of the receivers which cuts down on the maximum range at which the guidance signals can be detected.

Another approach favored by the large airplane manufacturers is to feed a single on-board receiver from an antenna to demodulate the desired guidance signals and then digitize the demodulated signal in two parallel digital processing chains to produce the radio guidance data. The processors compare their guidance data to detect any malfunction in the digital processing chain in real-time. To detect malfunctions in the RF down conversion/demodulation, signals whose malfunction may cause erroneous data are also monitored in real-time. In addition a test signal is injected into the RF receiver input during all phases of flight during which the landing guidance signal is not to be received, and signal processors monitor the test signal to detect any malfunction in the RF chain up until the landing final phase of flight is started. The drawback of this approach is that any malfunctions in RF components that cannot be monitored during final approach and landing can result in a loss of guidance.

A method which provides the capability to detect any receiver malfunction in real-time without added parts count and without degrading the receiver sensitivity/maximum detection range would be highly desirable.

SUMMARY

An electronic system with real-time fault detection is provided. In one embodiment, the system includes analog circuitry, having a first input coupled to receive an input signal and a second input coupled to receive a test signal. The test signal is at an edge of a selected band that contains the input signal. The test signal is used to identify faults in the electronic system during operation of the electronic system. The electronic system further includes an analog to digital (A/D) converter coupled to an output of the analog circuitry. The A/D converter generates digitized spectrum. Digital circuitry is coupled to the output of the A/D converter. The digital circuitry processes the input signal from the band to provide an output for the system and processes the test signal to detect faults in the analog circuitry, the digital circuitry and the A/D converter.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
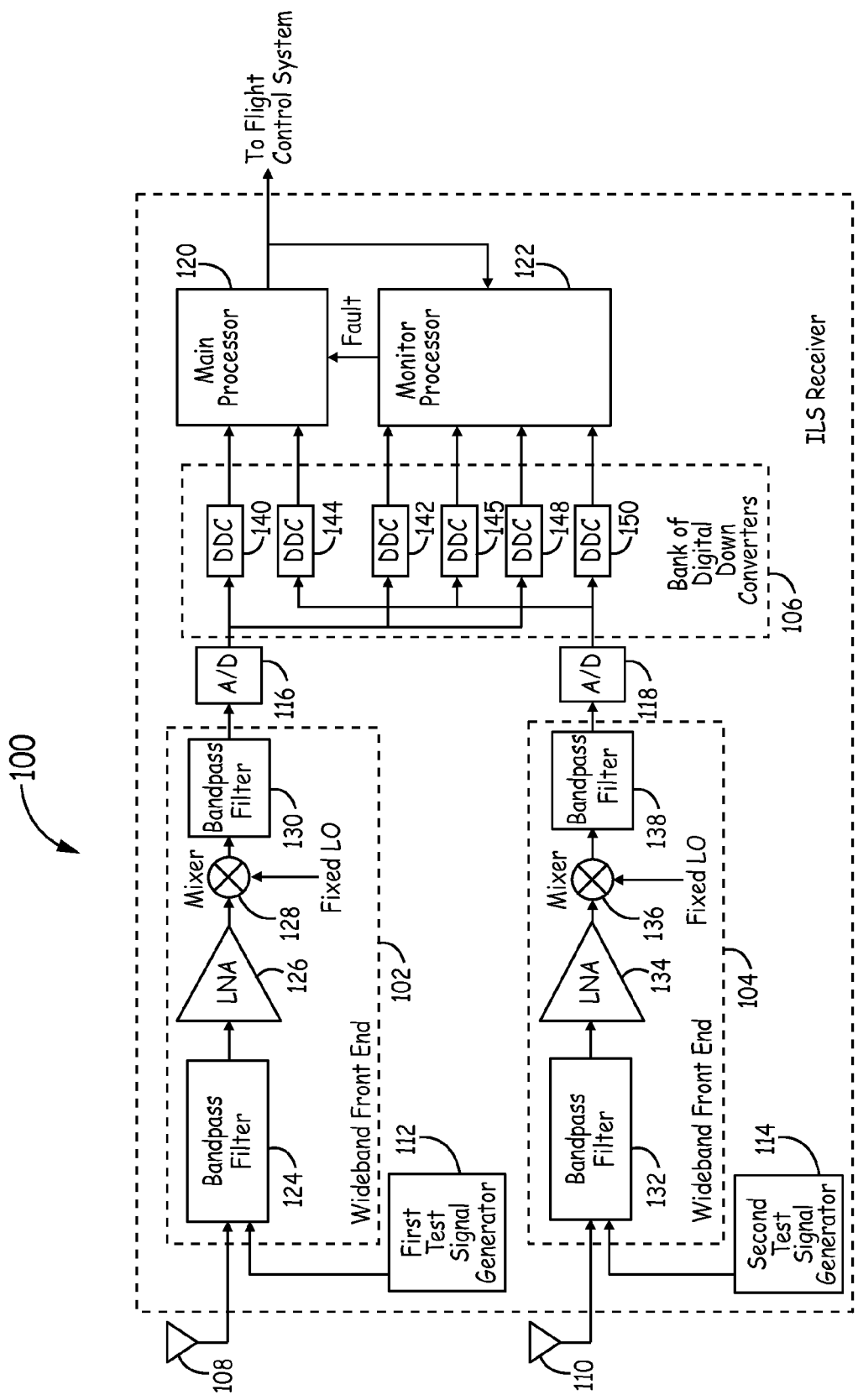
FIG. 1 is a block diagram of an on-board receiver in an Instrument Landing System (ILS) that includes a wide-band front end and a bank of digital down-converters according to one embodiment of the present invention.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present invention provide an ILS with real-time fault detection in an on-board receiver. The on-board receiver uses one or more wideband front end circuits that are tuned to the navigation bands containing guidance signals for the ILS. The term guidance signal refers to the localizer and glide slope signals or their equivalent in an automated landing system such as ILS. The on-board receiver also generates and injects test signals at the edge of each of one or more bands at the input to the respective wideband front end during the flight, including during the phase in which the guidance signals are received. The on-board receiver processes the guidance signals input to the wideband front ends using a combination of digital and analog circuitry. The on-board receiver detects faults in the digital circuitry by comparing redundant output calculations based on the guidance signals. The on-board receiver detects faults in the analog circuitry by comparing the test signals output from the digital circuitry with expected values.

FIG. 1 is a block diagram of an on-board receiver 100 in an ILS that includes wideband front ends 102 and 104 and a bank of digital down-converters 106 according to one embodiment of the present invention. Receiver 100 includes both analog circuitry (including mixed signal circuitry) and digital circuitry. Receiver 100 is designed to enable real-time detection of faults in both the analog circuitry and the digital circuitry that makes up receiver 100. In one embodiment, the analog circuitry includes the wideband front ends 102 and 104 as well as analog-to-digital (A/D) converters 116 and 118. The digital circuitry includes the bank of digital down-converters 106, the main processor 120 and the monitor processor 122.

Figure 3:
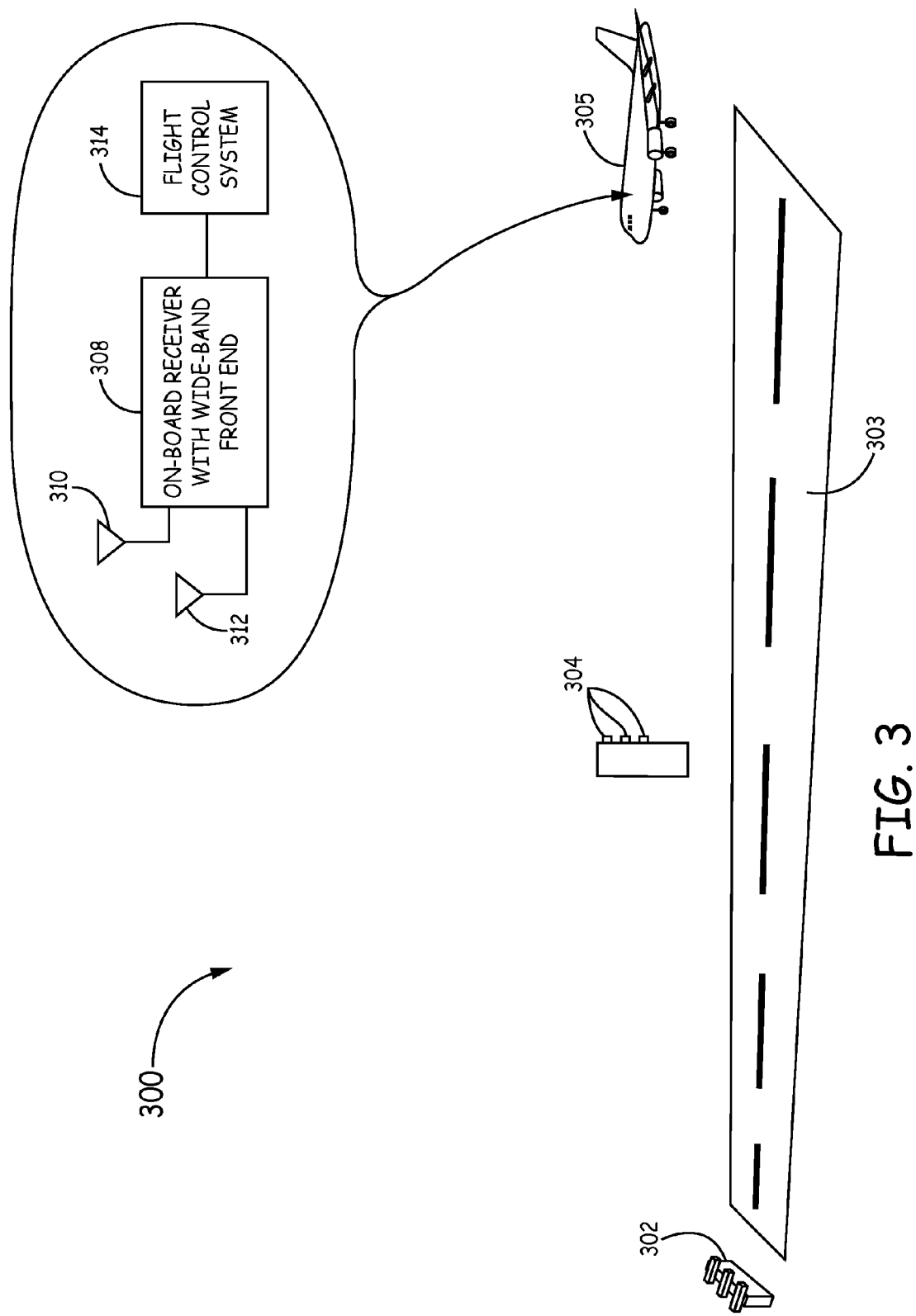
FIG. 3 is a perspective diagram of an ILS with real-time detection of faults in an on-board receiver according to one embodiment of the present invention.

Receiver 100 receives guidance signals from ground-based transmitters of the ILS and processes the signals to provide input to a flight control system on-board an aircraft (see FIG. 3). Receiver 100 processes the received guidance signals, along with test signals, to detect any faults in the operation of receiver 100. The test signals are injected during the flight of the associated aircraft, including during the landing phase. Further, the wideband feature of front ends 102 and 104 enable receipt of the assigned guidance signal without requiring tuning to a particular guidance signal and enables contemporaneous receipt of the test signal. This enables receiver 100 to simultaneously provide input to the flight control system and also detect faults in the circuitry by processing a known test signal in a real time.

Wideband front end 102 is coupled to antenna 108. In one embodiment, wideband front end 102 is tuned to receive the localizer (horizontal guidance) channels in the VHF navigation band (e.g., 108-112 MHz). First test signal generator 112 is coupled to inject a first test signal into wideband front end 102. The first test signal is injected while the aircraft is in flight, including during landing. In one embodiment, the first test signal is injected at an edge of the band, e.g., at 108 or 112 MHz In other embodiments, the test signal is injected at other appropriate frequencies in the bandwidth of wideband front end 102. The output of wideband front end 102 is coupled to A/D converter 116. A/D converter 116 converts the wideband output signal, e.g., the VHF navigation band, into digitized spectrum. The digitized spectrum includes the specific localizer signal assigned to the aircraft for the receiver 100 as well as the test signal from first test signal generator 112.

Wideband front end 104 is coupled to antenna 110. In one embodiment, wideband front end 104 is tuned to receive the glide slope (vertical guidance) channels in the UHF navigation band (e.g., 328-336 MHz). Second test signal generator 114 is coupled to inject a second test signal into wideband front end 104. The second test signal is injected during the flight including during the landing phase. In one embodiment, the second test signal is injected at an edge of the band, e.g., at 328 or 336 MHz In other embodiments, the test signal is injected at other appropriate frequencies in the bandwidth of wideband front end 104. The output of wideband front end 104 is coupled to A/D converter 118. A/D converter 118 converts the wideband output signal, e.g., the UHF navigation band, into digitized spectrum. The digitized spectrum includes the specific glide slope signal assigned to the aircraft for the receiver 100 as well as the test signal from second test signal generator 114.

FIG. 1 illustrates one embodiment of wideband front end. For example, wideband front end 102, in one embodiment, includes bandpass filter 124 that is coupled to the output of antenna 108. Bandpass filter is tuned to the appropriate frequency band. In one example, this frequency band is the VHF navigation band. Bandpass filter 124 is coupled to Low Noise Amplifier (LNA) 126. LNA 126 is coupled to mixer 128 that down-converts the output of LNA 126 to an intermediate frequency using a fixed local oscillator. The output of mixer 128 is provided to bandpass filter 130. The output of bandpass filter 130 is coupled to A/D converter 116. A/D converter 116 digitizes the down-converted frequency band, e.g., the VHF frequency band that has been down-converted to an intermediate frequency. This down-converted, digitized frequency band includes the channels that are used to carry the localizer signal as well as the first test signal. Wideband front end 104 similarly includes serially connected bandpass filter 132, low noise amplifier 134, mixer 136 and bandpass filter 138. These components of wideband front end 104 are tuned to process a second frequency band, such as the UHF navigation band, to provide a down-converted, digitized frequency band that includes the channels that are used to carry the glide slope signal as well as the second test signal.

Bank of digital down-converters 106 extracts signals from the digitized spectrum output by A/D converters 116 and 118 to be used by the receiver 100 for fault detection and flight control. First, some of the digital down-converters (DDC) are used to generate flight control information and to detect faults in the digital circuitry. DDC 140 and DDC 142 each down-convert a selected channel containing the desired first guidance signal, such as a localizer signal, and reject all other signals present in the digitized spectrum output from A/D converter 116. Further, DDC 144 and DDC 145 each down-convert a selected channel containing the desired second guidance signal, such as a glide slope signal, and reject all other signals present in the digitized output of A/D converter 118. The output of DDC 140 and 144 are used by main processor 120 to generate lateral and vertical guidance for the flight control system. Similar calculations are made by monitor processor 122 based on the outputs of DDC 142 and DDC 145. Monitor processor 122 compares the lateral and vertical guidance output of main processor 120 with its own calculation and declares a fault when the calculations of either lateral or vertical guidance do not match. This fault is communicated from monitor processor 122 to main processor 120. Main processor 120 flags the non-matching lateral or vertical guidance output as invalid.

Second, bank of digital down-converters 106 also includes DDCs that are tuned to down-convert signals used to identify faults in the analog circuitry. For example, bank of digital down-converters 106 includes DDC 148 and DDC 150. DDC 148 is tuned to down-convert the first test signal and to reject all other signals from the digitized spectrum output from A/D converter 116. Similarly, DDC 150 is tuned to down-convert the second test signal and to reject all other signals from the digitized spectrum output by A/D 118. Monitor processor 122 compares the first and second test signals from DDC 148 and DDC 150 with the expected results from the respective test signals. If the comparisons exceed accuracy limits, monitor processor 122 detects faults in wideband front end 102 and/or wideband front end 104. These faults are communicated by monitor processor 122 to main processor 120. Main processor 120 flags the guidance signal associated with the faulty wideband front end as invalid.

Although FIG. 1 has been shown with first and second wideband front ends, it is understood that any appropriate number of wideband front ends could be used in a particular embodiment based on the bands used to carry the expected and test signals. For example a single wideband front end could be used if the expected signal(s) are carried within a bandwidth associated with the wideband front end.

Figure 2:
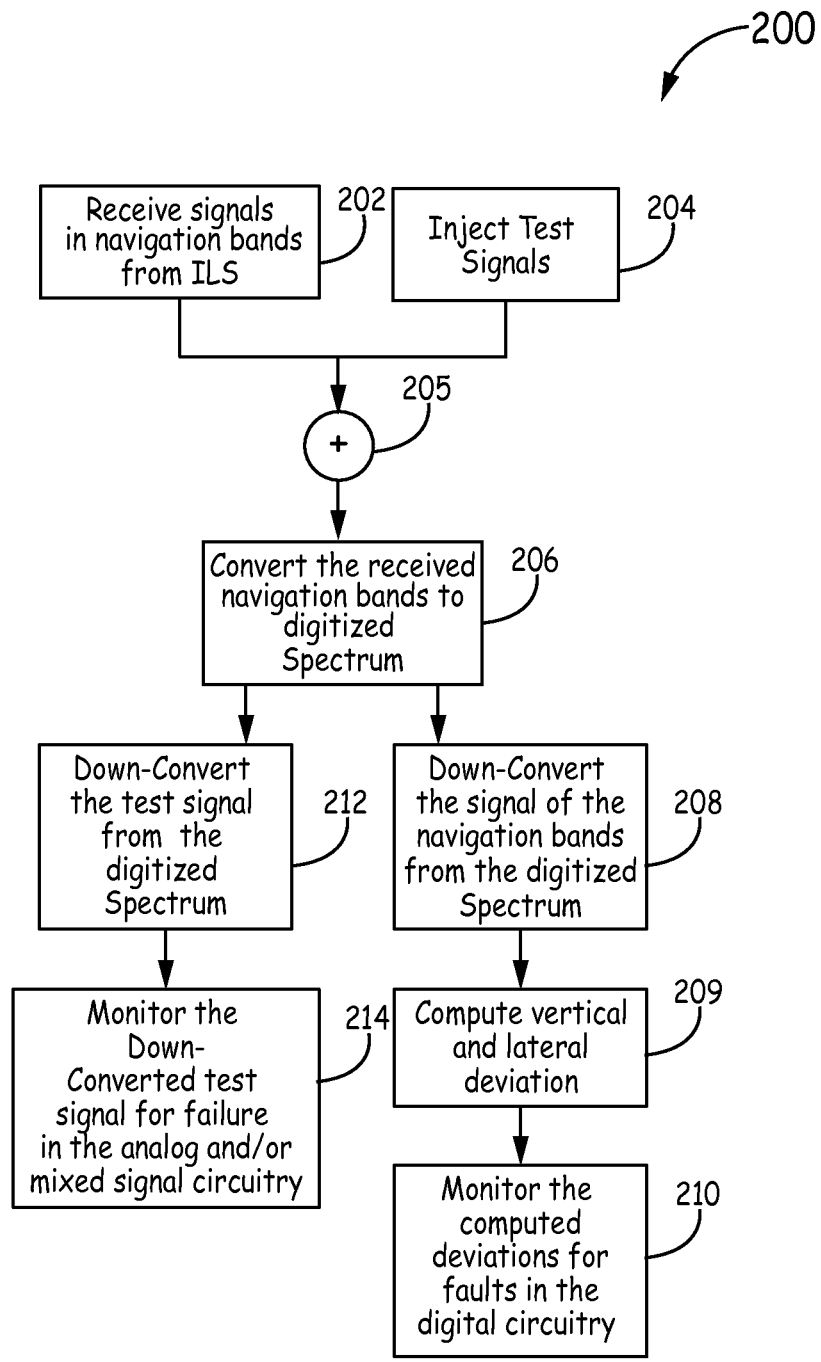
FIG. 2 is a flow chart of one embodiment of a method for detecting faults in an on-board receiver of an ILS according to one embodiment of the present invention.

FIG. 2 is a flow chart of one embodiment of a method 200 for detecting faults in an on-board receiver of an ILS according to one embodiment of the present invention. The method uses injected test signals along with redundant digital processing of guidance signals to detect faults in both the analog circuitry and digital circuitry of the receiver.

At block 202, the method receives signals in one or more navigation bands from an ILS. For example, the method receives signals in VHF and UHF navigation bands that include both glide slope and localizer signals from the ILS. At block 204, the method further injects test signals that are used to test analog circuitry of the receiver for faults. In one embodiment, a test signal is injected in each navigation band while the aircraft is in flight, including during the landing phase. Further, in one embodiment, the test signals are injected at a frequency adjacent to a band that contains an expected signal, e.g., adjacent to a respective navigation band. The signals in the navigation band and the test signals are combined (block 205) and, at block 206, the method converts the received navigation bands to digitized spectrum. The digitized spectrum includes each of the navigation bands along with the injected test signals.

The method 200 processes the digitized spectrum to detect faults in the analog and digital circuitry of the receiver. For the analog circuitry and mixed signal A/D converters, at block 212, the method digitally down-converts and extracts the test signals from among all the signals present in the digitized spectrum. At block 214, the method monitors the down-converted test signals for failure in the analog circuitry and/or mixed signal A/D converters. For example, the method compares the received test signals with expected values and declares a fault based on the comparison. For the digital circuitry, the method down-converts and extracts the desired, i.e. selected, guidance signals from among all the signals present in the navigation band such as the glide slope and localizer signals, at block 208. The guidance signals are then processed to compute and output the lateral and vertical deviations from the landing path at block 209. The method further monitors (210) the computed lateral and vertical deviations for faults in the digital circuitry. In one embodiment, the down conversion, extraction of the desired guidance signals, and lateral and vertical deviation calculations are performed in parallel using redundant and maybe even dissimilar digital processing circuitry. Disagreement between the redundant lateral or vertical deviation calculations indicates a fault in the digital circuitry.

FIG. 3 is a perspective diagram of an ILS 300 with real-time detection of faults of on-board receiver 308 according to one embodiment of the present invention. ILS 300 shows transmission of localizer and glide slope signals from ground station antenna 302 and 304, respectively. Aircraft 305 approaching runway 303 includes on-board receiver 308. This receiver, in one embodiment, is constructed as described above with respect to FIG. 1 and functions as described with respect to FIG. 1 or 2. On-board receiver 308 has a wideband front end that is coupled to first and second antenna 310 and 312 to receive guidance signals in two navigation bands. For example, antenna 310 receives a localizer signal in the VHF navigation band and antenna 312 receives a glide slope signal in the UHF navigation band. On-board receiver 308 uses these signals, along with test signals injected at the edge of the navigation bands, to provide fault detection for the analog and digital circuitry of on-board receiver 308. In the example shown in FIG. 3, the on-board receiver with wide-band front end 308 provides input to flight control system 314. The analog and some digital circuitry are tested for faults based on the test signals. Further, the digital circuitry is tested for faults based on the received guidance signals from the navigation bands. The receiver 308 provides real-time fault detection by digitizing each navigation band and then digitally down-converting the test and guidance signals.

Figure 4:
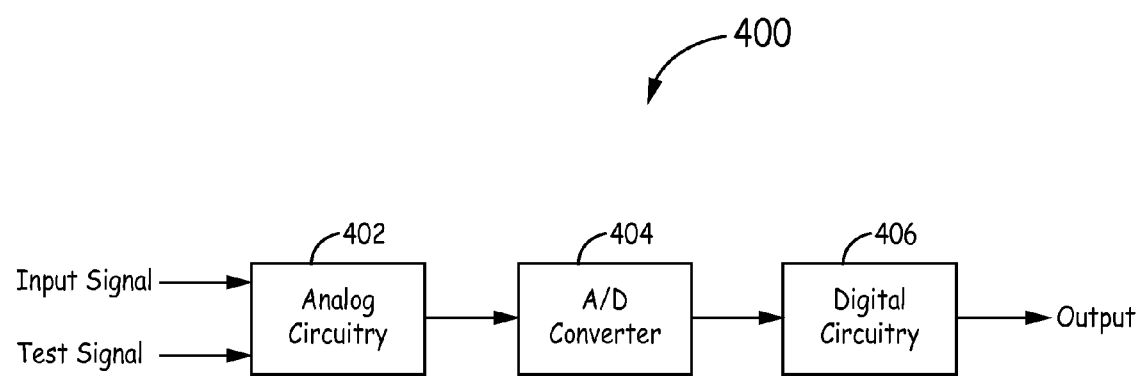
FIG. 4 is a block diagram of another embodiment of an electronic system according to the teachings of the present invention.

FIG. 4 is a block diagram of another embodiment of the present invention. Electronic system 400 includes analog circuitry 402, analog to digital converter (A/D) 404 and digital circuitry 406. Electronic system 400 receives an input signal at analog circuitry 402 and provides an output signal at digital circuitry 406. Analog circuitry 402 also receives a test signal. The test signal is processed by the same circuitry that processes the input signal and is used to detect faults in electronic system 400. Advantageously, electronic system 400 is enabled to test for faults while processing live signals.

In one embodiment, analog circuitry 402 has a wide bandwidth that accepts a band that includes the input signal. The test signal is injected to analog circuitry 402. In one embodiment, the injected test signal is injected at an edge of the band that contains the input signal.

In one embodiment, digital circuitry 400 detects faults in electronic system 400. Digital circuitry 406 detects faults in analog circuitry 402, A/D converter 404, and digital circuitry 406 using the injected test signal. Digital circuitry 406 compares the received test signal with an expected test signal and declares a fault based on a difference between the expected signal and the test signal.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes a receiver for an instrument landing system with real-time fault detection, the receiver comprising: a test signal generator; an antenna; a wideband front end, having an input coupled to the antenna and the test signal generator, wherein the test signal generator injects a test signal at an edge of a selected RF band that contains an expected guidance signal, the test signal used to identify faults in the instrument landing system; an analog to digital (A/D) converter coupled to an output of the wideband front end that generates digitized spectrum; a bank of digital down-converters, coupled to the output of the A/D converter; a main processor selectively coupled to the bank of digital down-converters; a monitor processor selectively coupled to the bank of digital down-converters; wherein the bank of digital down-converters selectively provide the test signal and the guidance signal from the band to the main and monitor processors to provide lateral and vertical expected guidance to a flight control system and to detect faults in the analog and digital circuitry of the receiver.

Example 2 includes the receiver of Example 1, and further comprising a second wideband front end that is coupled to a second antenna and a second test signal generator, wherein the second test signal generator injects a second test signal at an edge of a selected RF band that contains a second guidance signal used in the instrument landing system.

Example 3 includes the receiver of any of Examples 1-2, wherein: the selected RF band of the wideband front end comprises a VHF band that includes a localizer signal; and the second selected RF band of the second wideband front end comprises a UHF band that includes a glide slope signal.

Example 4 includes the receiver of Example 3, wherein the monitor processor uses the injected test signals to detect faults in the analog circuitry and the monitor and main processors use the localizer signal and the glide slope signal to detect faults in the digital circuitry.

Example 5 includes the receiver of any of Examples 1-4, wherein: the antenna comprises first and second antennas; the wideband front end comprises: a first wideband front end for a first band, having an input coupled to the first antenna, wherein the test signal generator injects a first test signal at an edge of the first band; a second wideband front end for a second band, having an input coupled to the second antenna, wherein the test signal generator injects a second test signal at an edge of the second band; the A/D converter comprises: a first analog to digital (A/D) converter coupled to an output of the first wideband front end; a second analog to digital (A/D) converter coupled to an output of the second wideband front end; the bank of digital down-converters are coupled to the outputs of the first and second A/D converters; wherein the bank of digital down-converters provide the first and second test signals to the monitor processor to continuously monitor for faults in the first and second wideband front ends; wherein the bank of digital down-converters also provide a selected channel from the first wideband front end to the main processor and to the monitor processor and provide a selected channel from the second wideband front end to the main processor and to the monitor processor; and wherein the main processor and the monitor processor perform parallel, redundant computations of the lateral and vertical deviation and compare the computations to detect any faults in the bank of digital down-converters, the main processor and the monitor processor.

Example 6 includes the receiver of Example 5, wherein the first wideband receiver comprises: a first bandpass filter with an input that provides the input for the first wideband receiver; a low noise amplifier, coupled to the bandpass filter; a mixer, coupled to the low noise amplifier, that down-converts the first band to an intermediate frequency; and a second bandpass filter coupled to the output of the mixer.

Example 7 includes the receiver of Example 6, wherein the first bandpass filter passes a VHF frequency band having a plurality of localizer channels and the first test signal, and the second bandpass filter has a bandwidth that passes the down-converted VHF band with the plurality of localizer channels and the first test signal.

Example 8 includes the receiver of any of Examples 6-7, wherein the first bandpass filter passes frequencies between 108 and 112 MHz and the test signal has a frequency of 108 MHz.

Example 9 includes the receiver of any of Examples 5-8, wherein the bank of digital down-converters includes: a first digital down-converter, coupled between the first A/D converter and the main processor, the first digital down-converter down converting a selected localizer channel in the first band assigned to the receiver; a second digital down-converter, coupled between the second A/D converter and the main processor, the second digital down-converter converting a selected glide slope channel in the second band assigned to the receiver; a third digital down-converter, coupled between the first A/D converter and the monitor processor, the third digital down-converter down converting the selected localizer channel in the first band assigned to the receiver; and a fourth digital down-converter, coupled between the second A/D converter and the monitor processor, the fourth digital down-converter converting the selected glide slope channel in the second band assigned to the receiver.

Example 10 includes the receiver of Example 9, wherein: the main processor is coupled to the monitor processor to provide lateral and vertical guidance data, calculated from the output of first and second digital down-converters, to the monitor processor; and the monitor processor is coupled to the main processor to provide a failure warning when the lateral and vertical guidance data from the main processor do not match lateral and vertical guidance calculated by the monitor processor calculated from the output of the third and fourth digital down-converters.

Example 11 includes the receiver of any of Examples 9-10, wherein the bank of digital down converters further includes: a fifth digital down-converter, coupled between the first A/D converter and the monitor processor, the fifth digital down-converter converting the first test signal for processing by the monitor processor to detect faults in the first wideband front end; a sixth digital down-converter, coupled between the second A/D converter and the monitor processor, the sixth digital down-converter converting the second test signal for processing by the monitor processor to detect faults in the second wideband front end; and wherein the monitor processor provides a failure warning to the main processor when there is a fault in either the first or the second test signal.

Example 12 includes the receiver of any of Examples 5-11, wherein the second wideband receiver comprises: a first bandpass filter with an input that provides the input for the second wideband receiver; a low noise amplifier, coupled to the bandpass filter; a mixer, coupled to the low noise amplifier, that down-converts the first band to an intermediate frequency; and a second bandpass filter coupled to the output of the mixer.

Example 13 includes the receiver of Example 12, wherein the first bandpass filter passes a UHF frequency band having a plurality of glide slope channels and the second test signal, and the second bandpass filter has a bandwidth that passes the downconverted UHF band with the plurality of glide slope channels and the second test signal.

Example 14 includes a method for real-time fault detection in a receiver of an instrument landing system, the method comprising: receiving a band from a transmitter of the instrument landing system, the band including an expected signal; injecting a test signal at a frequency adjacent to the band that contains the expected signal; converting the test signal and the band that contains the expected signal to a digitized spectrum; selectively down-converting the expected signal and the test signal from the digitized spectrum; monitoring the down-converted test signal to identify faults in analog and mixed signal circuitry of the receiver; computing vertical and lateral deviation based on the down-converted expected signals; and monitoring the computed vertical and lateral deviations to identify faults in digital circuitry of the receiver.

Example 15 includes the method of Example 14, wherein receiving the guidance signal from a transmitter of an instrument landing system comprises receiving localizer and glide slope signals.

Example 16 includes the method of Example 15, wherein injecting the test signal comprises injecting a first test signal adjacent to the VHF band used for the localizer signal and injecting a second test signal adjacent to the UHF band used for the glide slope signal.

Example 17 includes the method of any of Examples 14-16, wherein selectively down-converting comprises down-converting signals from the digitized spectrum using a plurality of digital down-converter circuits.

Example 18 includes the method of any of Examples 14-17, wherein monitoring the down-converted test signal comprises comparing the down-converted test signal with an expected test signal.

Example 19 includes the method of any of Examples 14-18, wherein computing vertical and lateral deviations comprises separately computing vertical and lateral deviations in parallel, redundant paths.

Example 20 includes an electronic system with real-time fault detection, the system comprising: analog circuitry, having a first input coupled to receive an input signal and a second input coupled to receive a test signal, wherein the test signal is at an edge of a selected band that contains the input signal, the test signal used to identify faults in the electronic system during operation of the electronic system; an analog to digital (A/D) converter coupled to an output of the analog circuitry, the A/D converter generating digitized spectrum; digital circuitry, coupled to the output of the A/D converter; wherein the digital circuitry processes the input signal from the band to provide an output for the system and processes the test signal to detect faults in the analog circuitry, the digital circuitry and the A/D converter.

What is claimed is:

1. A receiver for an instrument landing system with real-time fault detection, the receiver comprising:
a test signal generator;
an antenna;
a wideband front end, having an input coupled to the antenna and the test signal generator, wherein the test signal generator injects a test signal at an edge of a selected RF band that contains an expected guidance signal, the test signal used to identify faults in the instrument landing system;
an analog to digital (A/D) converter coupled to an output of the wideband front end that generates digitized spectrum, the digitized spectrum including the injected test signal and the selected RF band, including the expected guidance signal;
a bank of digital down-converters, coupled to the output of the A/D converter;
a main processor selectively coupled to the bank of digital down-converters;
a monitor processor selectively coupled to the bank of digital down-converters;
wherein the bank of digital down-converters selectively provides the test signal and the expected guidance signal from the digitized spectrum to the main and monitor processors to provide lateral and vertical guidance to a flight control system and to detect faults in the analog and digital circuitry of the receiver.

2. The receiver of claim 1, and further comprising a second wideband front end that is coupled to a second antenna and a second test signal generator, wherein the second test signal generator injects a second test signal at an edge of a selected RF band that contains a second guidance signal used in the instrument landing system.

3. The receiver of claim 2, wherein:
the selected RF band of the wideband front end comprises a VHF band that includes a localizer signal; and
the second selected RF band of the second wideband front end comprises a UHF band that includes a glide slope signal.

4. The receiver of claim 3, wherein the monitor processor uses the injected test signals to detect faults in the analog circuitry and the monitor and main processors use the localizer signal and the glide slope signal to detect faults in the digital circuitry.

5. The receiver of claim 1, wherein:
the antenna comprises first and second antennas;
the wideband front end comprises:
a first wideband front end for a first band, having an input coupled to the first antenna, wherein the test signal generator injects a first test signal at an edge of the first band;
a second wideband front end for a second band, having an input coupled to the second antenna, wherein the test signal generator injects a second test signal at an edge of the second band;
the A/D converter comprises:
a first analog to digital (A/D) converter coupled to an output of the first wideband front end;
a second analog to digital (A/D) converter coupled to an output of the second wideband front end;
the bank of digital down-converters are coupled to the outputs of the first and second A/D converters;
wherein the bank of digital down-converters provide the first and second test signals to the monitor processor to continuously monitor for faults in the first and second wideband front ends;
wherein the bank of digital down-converters also provide a selected channel from the first wideband front end to the main processor and to the monitor processor and provide a selected channel from the second wideband front end to the main processor and to the monitor processor; and
wherein the main processor and the monitor processor perform parallel, redundant computations of the lateral and vertical deviation and compare the computations to detect any faults in the bank of digital down-converters, the main processor and the monitor processor.

6. The receiver of claim 5, wherein the first wideband front end comprises:
a first bandpass filter with an input that provides the input for the first wideband front end;
a low noise amplifier, coupled to the bandpass filter;
a mixer, coupled to the low noise amplifier, that down-converts the first band to an intermediate frequency; and
a second bandpass filter coupled to the output of the mixer.

7. The receiver of claim 6, wherein the first bandpass filter passes a VHF frequency band having a plurality of localizer channels and the first test signal, and the second bandpass filter has a bandwidth that passes the downconverted VHF band with the plurality of localizer channels and the first test signal.

8. The receiver of claim 6, wherein the first bandpass filter passes frequencies between 108 and 112 MHz and the test signal has a frequency of 108 MHz.

9. The receiver of claim 5, wherein the bank of digital down-converters includes:
a first digital down-converter, coupled between the first A/D converter and the main processor, the first digital down-converter down converting a selected localizer channel in the first band assigned to the receiver;
a second digital down-converter, coupled between the second A/D converter and the main processor, the second digital down-converter converting a selected glide slope channel in the second band assigned to the receiver;
a third digital down-converter, coupled between the first A/D converter and the monitor processor, the third digital down-converter down converting the selected localizer channel in the first band assigned to the receiver; and
a fourth digital down-converter, coupled between the second A/D converter and the monitor processor, the fourth digital down-converter converting the selected glide slope channel in the second band assigned to the receiver.

10. The receiver of claim 9, wherein:
the main processor is coupled to the monitor processor to provide lateral and vertical guidance data, calculated from the output of first and second digital down-converters, to the monitor processor; and
the monitor processor is coupled to the main processor to provide a failure warning when the lateral and vertical guidance data from the main processor do not match lateral and vertical guidance calculated by the monitor processor calculated from the output of the third and fourth digital down-converters.

11. The receiver of claim 9, wherein the bank of digital down converters further includes:
a fifth digital down-converter, coupled between the first A/D converter and the monitor processor, the fifth digital down-converter converting the first test signal for processing by the monitor processor to detect faults in the first wideband front end;
a sixth digital down-converter, coupled between the second A/D converter and the monitor processor, the sixth digital down-converter converting the second test signal for processing by the monitor processor to detect faults in the second wideband front end; and
wherein the monitor processor provides a failure warning to the main processor when there is a fault in either the first or the second test signal.

12. The receiver of claim 5, wherein the second wideband front end comprises:
a first bandpass filter with an input that provides the input for the second wideband front end;
a low noise amplifier, coupled to the bandpass filter;
a mixer, coupled to the low noise amplifier, that down-converts the first band to an intermediate frequency; and
a second bandpass filter coupled to the output of the mixer.

13. The receiver of claim 12, wherein the first bandpass filter passes a UHF frequency band having a plurality of glide slope channels and the second test signal, and the second bandpass filter has a bandwidth that passes the downconverted UHF band with the plurality of glide slope channels and the second test signal.

14. A method for real-time fault detection in a receiver of an instrument landing system, the method comprising:
receiving a band from a transmitter of the instrument landing system, the band including an expected signal;
injecting a test signal at a frequency adjacent to the band that contains the expected signal;
converting the test signal and the band that contains the expected signal to a digitized spectrum, the digitized spectrum including the test signal and the band that contains the expected signal;
selectively down-converting the expected signal and the test signal from the digitized spectrum;
monitoring the down-converted test signal to identify faults in analog and mixed signal circuitry of the receiver; providing vertical and lateral guidance to an aircraft system based on the down-converted expected signal;
computing vertical and lateral deviation based on the down-converted expected signal; and
monitoring the computed vertical and lateral deviations to identify faults in digital circuitry of the receiver.

15. The method of claim 14, wherein receiving the guidance signal from a transmitter of an instrument landing system comprises receiving localizer and glide slope signals.

16. The method of claim 15, wherein injecting the test signal comprises injecting a first test signal adjacent to the VHF band used for the localizer signal and injecting a second test signal adjacent to the UHF band used for the glide slope signal.

17. The method of claim 14, wherein selectively down-converting comprises down-converting signals from the digitized spectrum using a plurality of digital down-converter circuits.

18. The method of claim 14, wherein monitoring the down-converted test signal comprises comparing the down-converted test signal with an expected test signal.

19. The method of claim 14, wherein computing vertical and lateral deviations comprises separately computing vertical and lateral deviations in parallel, redundant paths.

20. An electronic system with real-time fault detection, the system comprising:
analog circuitry, having a first input coupled to receive an input signal of vertical and lateral guidance for an aircraft and a second input coupled to receive a test signal, wherein the test signal is at an edge of a selected band that contains the input signal, the test signal used to identify faults in the electronic system during operation of the electronic system;
an analog to digital (A/D) converter coupled to an output of the analog circuitry, the A/D converter generating digitized spectrum, the digitized spectrum including the test signal and the selected band that contains the input signal;
digital circuitry, coupled to the output of the A/D converter;
wherein the digital circuitry processes the input signal from the selected band to provide an output for the system and processes the test signal to detect faults in the analog circuitry, the digital circuitry and the A/D converter and provides vertical and lateral guidance to an aircraft system based on the digitized spectrum.

* * * * *